United States Patent [19]
Skog

[11] Patent Number: 5,930,701
[45] Date of Patent: Jul. 27, 1999

[54] PROVIDING CALLER ID WITHIN A MOBILE TELECOMMUNICATIONS NETWORK

[75] Inventor: Bengt Robert Skog, Sollentuna, Sweden

[73] Assignee: Telefonaktiebolaget L M Ericsson (publ), Sweden

[21] Appl. No.: 08/730,815

[22] Filed: Oct. 17, 1996

[51] Int. Cl.[6] .................................................. H04Q 7/38
[52] U.S. Cl. ............................................................ 455/415
[58] Field of Search .................................. 455/412, 415; 379/142

[56] References Cited

U.S. PATENT DOCUMENTS 5,537,457  7/1996  Lantto et al. ............................ 455/433

FOREIGN PATENT DOCUMENTS

| 0 699 009 A1 | 2/1996 | European Pat. Off. . |
| 3-7459 | 1/1991 | Japan . |
| WO 94/06236 | 3/1994 | WIPO . |
| WO 96/20572 | 7/1996 | WIPO . |

OTHER PUBLICATIONS

GPI abstract and image or Japanese patent specification JP 3–7459 (Tamura), Jan. 14, 1991.
*GPRS, General Packet Radio Service* by Sven Åkesson, Ericsson Radio Systems AB, S–16480 Stockholm, Sweden 1995 Fourth IEEE International Conference, Nov. 6, 1995, Tokyo (JP), pp. 640–643.

*Primary Examiner*—Andrew M. Dolinar
*Attorney, Agent, or Firm*—Jenkens & Gilchrist, P.C.

[57] ABSTRACT

A calling party directory number associated with a terminating call towards a unreachable mobile station is stored at a home location register (HLR) associated with the unreachable mobile station. Thereafter, the HLR receives an indication from a particular mobile switching center (MSC) that the mobile station is now reachable. In response to such an indication, the HLR retrieves the previously stored calling party directory number and transmits the retrieved directory number to the reachable mobile station using unstructured messages. By displaying the transmitted number, the mobile station is able to inform the mobile subscriber of the attempted incoming calls received while the mobile station was either turned off or out of the service area.

27 Claims, 7 Drawing Sheets

5,930,701

PROVIDING CALLER ID WITHIN A MOBILE TELECOMMUNICATIONS NETWORK

BACKGROUND OF THE INVENTION

1. Technical Field of the Invention

The present invention relates to telecommunications systems and, in particular, to the application of caller id functionality to mobile stations within a mobile telecommunications network.

2. Description of Related Art

With the introduction of Signaling System No. 7 (SS7) telecommunications systems, and other SS7 based signaling protocols, a number of advanced subscriber features are now provided to mobile subscribers. One such subscriber feature or service is the ability to enable the called party mobile subscriber to ascertain the identity of the calling party subscriber when an incoming call is received. As an illustration, a directory number associated with the calling party subscriber terminal is displayed to the called party subscriber as the incoming call is terminated to the called party subscriber terminal. The called party subscriber then has the option of not answering the incoming call from a unwanted individual. Moreover, such calling party directory numbers can also be stored and utilized later by the called party subscriber to return calls to the previous calling party subscribers.

With the introduction of the Global System for Mobile (GSM) communications standard, a number of other special subscriber services are available to enable mobile subscribers to not only communicate data which represent voice, but also other unstructured data over the serving Public Land Mobile Network (PLMN). An example of such special subscriber services is the communication of unstructured data between a mobile station and a serving mobile telecommunications network. Messages like Short Message Service (SMS) messages are utilized to communicate text data between a serving mobile switching center (MSC) and a mobile station. Using SMS messages, the serving MSC or any other connected node can transmit user information to the mobile station and have the mobile station store the received user information in an associated Subscriber Identity Module (SIM) card. As an illustration, SMS messages can then be used to update a SIM card with the latest menu options, speed dial lists, subscriber feature information, etc.

Another example of unstructured data communications comprises the Unstructured Supplementary Service Data (USSD) message. Using USSD messages, a mobile telecommunications network is able to transparently communicate text data with a mobile station. For example, a mobile station can receive and display text messages on an attached display unit and subsequently return a reply message back to the mobile network.

A mobile subscriber, however, is not capable of receiving any of the above services and messages unless the mobile station is turned on and is responding to the paging performed by the serving MSC. For example, if the mobile station is outside of the effective radio coverage area or turned off, all incoming calls towards the unreachable mobile station are unsuccessfully terminated. In order for the mobile station to subsequently determine the identity of the previously attempted incoming call, the mobile station has to either be associated with voice mail or be called back by the same calling party. Such alternatives are disadvantageous for a number of reasons. Not all calling party subscribers leave voice messages along with their directory numbers with the called party's voice mail system. The called party mobile station must also repeatedly access its voice mail system and inconveniently check its messages each time after being turned on or traveling back into the service area.

Accordingly, there is a need for a mechanism to enable the serving mobile telecommunications network to automatically inform the mobile station of the calling party directory numbers associated with the attempted incoming calls received and directed towards the mobile station while the unit was turned off or out of reach.

SUMMARY OF THE INVENTION

The present invention discloses a method and apparatus for enabling a serving mobile telecommunications network to communicate a directory number associated with an attempted incoming call received towards a particular mobile station while that mobile station was not reachable.

A serving mobile switching center (MSC) informs a home location register (HLR) associated with a particular mobile station that the mobile station is no longer reachable. Thereafter, whenever a request for a routing information associated with an incoming call is received by the HLR, the HLR stores the directory number associated with the calling party subscriber. The HLR subsequently receives a location update signal or an International Mobile Subscriber Identity Attach (IMSI Attach) signal from a particular MSC informing the HLR of the mobile station's availability. The HLR then retrieves the stored directory number associated with the previously received incoming call and transmits it to the mobile station via unstructured messages. Such unstructured messages include Short Message Service (SMS), Unstructured Supplementary Service Data (USSD), and General Packet Radio Switch (GPRS) data.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
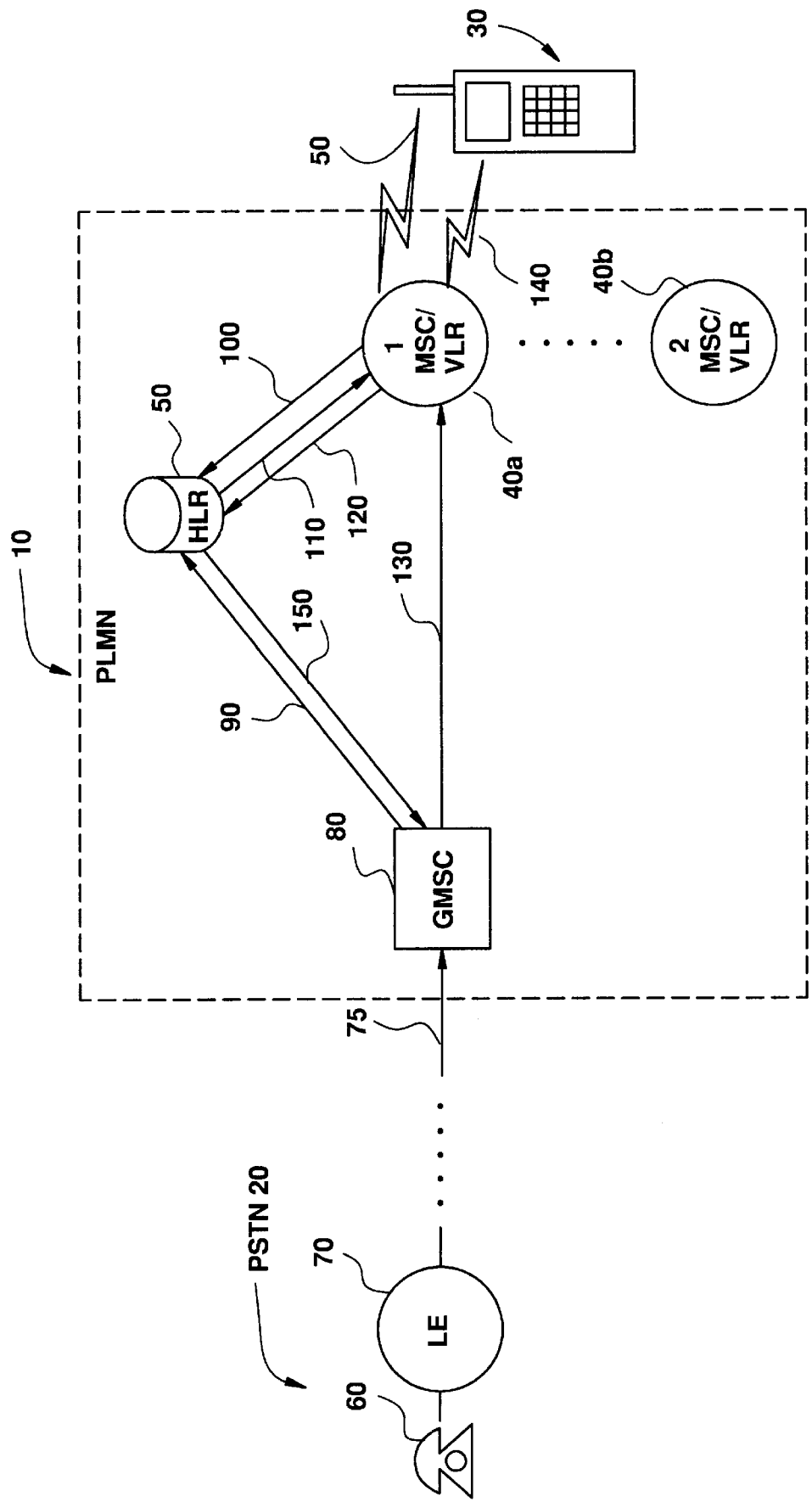
FIG. 1 is a block diagram of a Public Land Mobile Network (PLMN) interconnected with a Public Switched Telephone Network (PSTN) to provide mobile service to a mobile station.

FIG. 1 is a block diagram of a telecommunications network illustrating the network interconnection of a Public Land Mobile Network (PLMN) 10 to a Public Switched Telephone Network (PSTN) 20. A mobile station 30 (also known as mobile terminal or equipment) is associated with a particular PLMN as the home PLMN 10. Within each PLMN, e.g., home PLMN 10, there are a number of different mobile switching centers (MSCs), (only two of which are shown in FIG. 1 for exemplary purposes) servicing the geographic area covered by the PLMN. Each MSC is further associated with a visitor location register (VLR) for storing necessary subscriber information related to the mobile subscriber traveling within its MSC coverage area (hereinafter referred to as MSC/VLR 40a–40b). Each mobile station (only one shown in FIG. 1) 30 within the home PLMN 10 is further assigned to a particular home location register (HLR) 50. The HLR 50 is a centralized database storing subscriber information related to the mobile station 30. For example, the HLR 50 stores and maintains subscriber application data, preferred long distance carrier data, and, more particularly, the identity of the MSC/VLR currently providing mobile service to the mobile station 30. Such an identity is later utilized by the PLMN 10 to determine the appropriate MSC/VLR currently serving the mobile station and to properly reroute incoming calls to the called party mobile station 30.

In order to constantly update the HLR 50 with the current location of the mobile station 30, whenever the mobile station 30 turns on its unit for the first time or travels into a new MSC coverage area, the associated MSC/VLR, e.g., MSC 40a, performs a location update with the associated HLR 50. The serving MSC/VLR 40a receives a mobile station identification number, such as an International Mobile Subscriber Identity (IMSI) number, from the mobile station 30 as the mobile station 30 registers with the serving MSC/VLR 40a. Since a series of IMSI numbers are pre-assigned to a particular HLR, by utilizing the received IMSI number as the destination address, the serving MSC/VLR 40a is able to inform the appropriate HLR 50 of the current location of the mobile station 30. Such a location update signal 100 further requests the HLR 50 to provide subscriber information associated with the registering mobile station 30 to the updating MSC/VLR 40a. Such information may comprise subscriber feature category data needed by the serving MSC/VLR 40a for providing mobile service to the registering mobile station 30.

Thereafter, whenever an incoming call is received towards the mobile station 30, the previously updated location data within the HLR 50 are utilized by the serving PLMN 10 to properly reroute the call connection to the mobile station 30. As an illustration, a wireline terminal 60 connected to a local exchange (LE) 70 originates a call setup signal, such as an Integrated Service Digital Network User Part (ISUP) based Initial Address Message (IAM), towards the mobile station 30 using a Mobile Subscriber Integrated Service Digital Network (MSISDN) number assigned to the mobile station 30 as the called party number. The directory number associated with the wireline terminal 60 is further included in the transmitted IAM signal as the calling party number. Utilizing the indicated MSISDN number as the destination address, the connected Signaling System No. 7 (SS7) telecommunications networks route the received ISUP signal to a Gateway Mobile Switching Center (GMSC) 80 associated with the home PLMN 10. As a result, a circuit or trunk call connection 75 is established between the local exchange 70 and the GMSC 80. Not knowing where the called party mobile station 30 is currently located, the GMSC 80 transmits a Mobile Application Part (MAP) based signal to the HLR 50 associated with the called party mobile station 30 for a routing instruction (signal 90). The HLR 50, in turn, retrieves the previously stored location information associated with the specified MSISDN number, identifies the MSC/VLR 40a currently serving the associated mobile station 30, and transmits another MAP based signal 110 requesting a roaming number to the identified MSC/VLR 40a. The serving MSC/VLR 40a then returns the roaming number representing the serving MSC/VLR 40a to the HLR 50 via another MAP based signal 120. The received roaming number is, in turn, transmitted back to the requesting GMSC 80 via yet another MAP based signal 150. Utilizing the received roaming number as the new called party address, the GMSC 80 reroutes the received incoming call connection to the serving MSC/VLR 40a. Accordingly, a call connection 130 between the GMSC 80 and the serving MSC/VLR 40a is established. The serving MSC/VLR 40a then pages the mobile station 30 traveling within its coverage area, assigns a pair of radio channels 140, and enables the wireline terminal 60 to communicate with the called party mobile station 30. As an option, the calling party number associated with the wireline terminal 60 and included in the received ISUP call setup signal, such as an IAM, may further be transmitted to the mobile station 30. Such calling party directory number is then displayed to enable the mobile subscriber to ascertain the identity of the calling party.

Signaling for telecommunications services, such as MAP and ISUP signaling as described above, is normally performed in a structured way. For example, specific predefined data, formats, and signal names are used to setup a speech connection, to perform handovers, and to authenticate mobile subscriber information when providing telecommunications service to a mobile subscriber. With the introduction of the Global System for Mobile (GSM) communications and the Personal Communications System (PCS), a number of new and advanced supplementary services are being provided to mobile subscribers. Since these supplementary services utilize user specified data, there are no structured ways to communicate these data between a serving PLMN and a mobile station. As a result, a number of unstructured message protocols have been developed for the GSM or PCS environment. One such protocol is the Short Message Service (SMS) protocol for one-way transporting of information between a PLMN and a mobile station. Another protocol is Unstructured Supplementary Service Data (USSD) which has been introduced to enable user interaction between GSM PLMN applications and a mobile station in a transparent way through the mobile telecommunications network. It is transparent because no review or manipulation of the contents of the message is performed during transportation.

Figure 2:
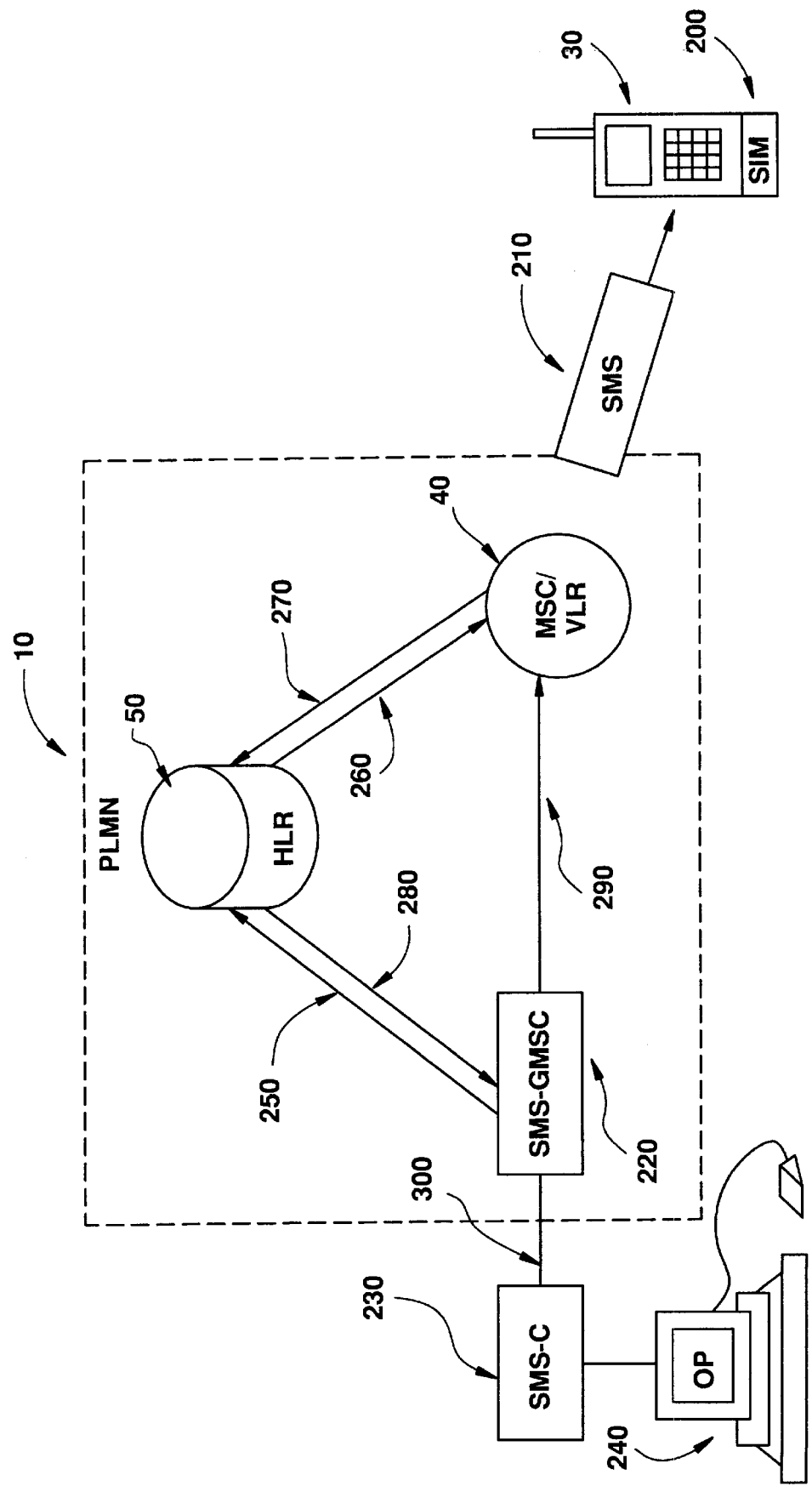
FIG. 2 is a block diagram of a Short Message Service (SMS) communications network illustrating the communication of a SMS message to a mobile station.

Reference is now made to FIG. 2 where a block diagram illustrating the communication of a Short Message Service (SMS) message between an SMS operator 240 and the mobile station 30 is shown. The SMS operator 240 sends a string of alphanumeric characters to the Short Message Service Center (SMS-C) 230 to be transmitted to the mobile station 30. The SMS-C 230 encapsulates the entered character data into a packet message, such as Signaling System No. 7 (SS7) signals or X.25 protocol packets 300, and routes the message to a Short Message Service—Gateway Mobile Switching Center (SMS-GMSC) 220 within the home PLMN 10 associated with the destination mobile station 30.

In a manner similar to the rerouting of an incoming trunk call connection as described in FIG. 1, the SMS-GMSC 220 interrogates the HLR 50 associated with the mobile station 30 for routing instructions.

As an illustration of such an HLR interrogation, the SMS-GMSC 220 transmits a MAP based signal 250 to the HLR 50 associated with the MSISDN number specified in the received packet signal. The HLR 50, in turn, retrieves the previously updated mobile station location data, determines the MSC/VLR 40 currently serving the destination mobile station 30, and transmits another MAP based signal 260 requesting a roaming number to the determined MSC/VLR 40. The MSC/VLR 40 then provides the roaming number back to the HLR 50 via another MAP signal 270. The HLR 50 further forwards the received roaming number back to the requesting SMS-GMSC 220 via yet another MAP based signal 280. Utilizing the received roaming number representing the serving MSC/VLR 40, the SMS-GMSC 220 subsequently reroutes the received SMS message to the serving MSC/VLR 40 (signal 290). The mobile station 30 is then paged and, upon acknowledgment, the MSC/VLR 40 encapsulates the received character data into an SMS message 210 and delivers the SMS message 210 to the mobile station 30 over one of the control data channels. A control data channel such as a Stand-alone Dedicated Control Channel (SDCCH) or Slow Associated Control Channel (SACCH) is used instead of a traffic channel (TCH) to allow connection-less data communications. After receiving the SMS message 210 encapsulating the character data, the mobile station 30 acts merely as a buffer and passes the received data to the attached Subscriber Identity Module (SIM) card 200. The SIM card 200 then stores the received data into an internal buffer or memory register. Lastly, if the delivery has been successful, a successful delivery report is sent back from the mobile station 30 to the serving MSC/VLR 40, and subsequently from the serving MSC/VLR 40 to the SMS-C 230. Otherwise, a failure report is generated.

By utilizing SMS messages and a SIM card, a subscriber feature provider within a telecommunications network can deliver the latest subscriber feature information to the mobile station 30 without requiring the mobile station 30 to be taken in for manual service. For example, whenever the mobile subscriber adds or deletes a new number from his speed dialing subscriber feature, the feature provider can remotely update the mobile station 30 within the mobile subscriber's latest speed dialing lists or options without inconveniencing the mobile subscriber.

Figure 3:
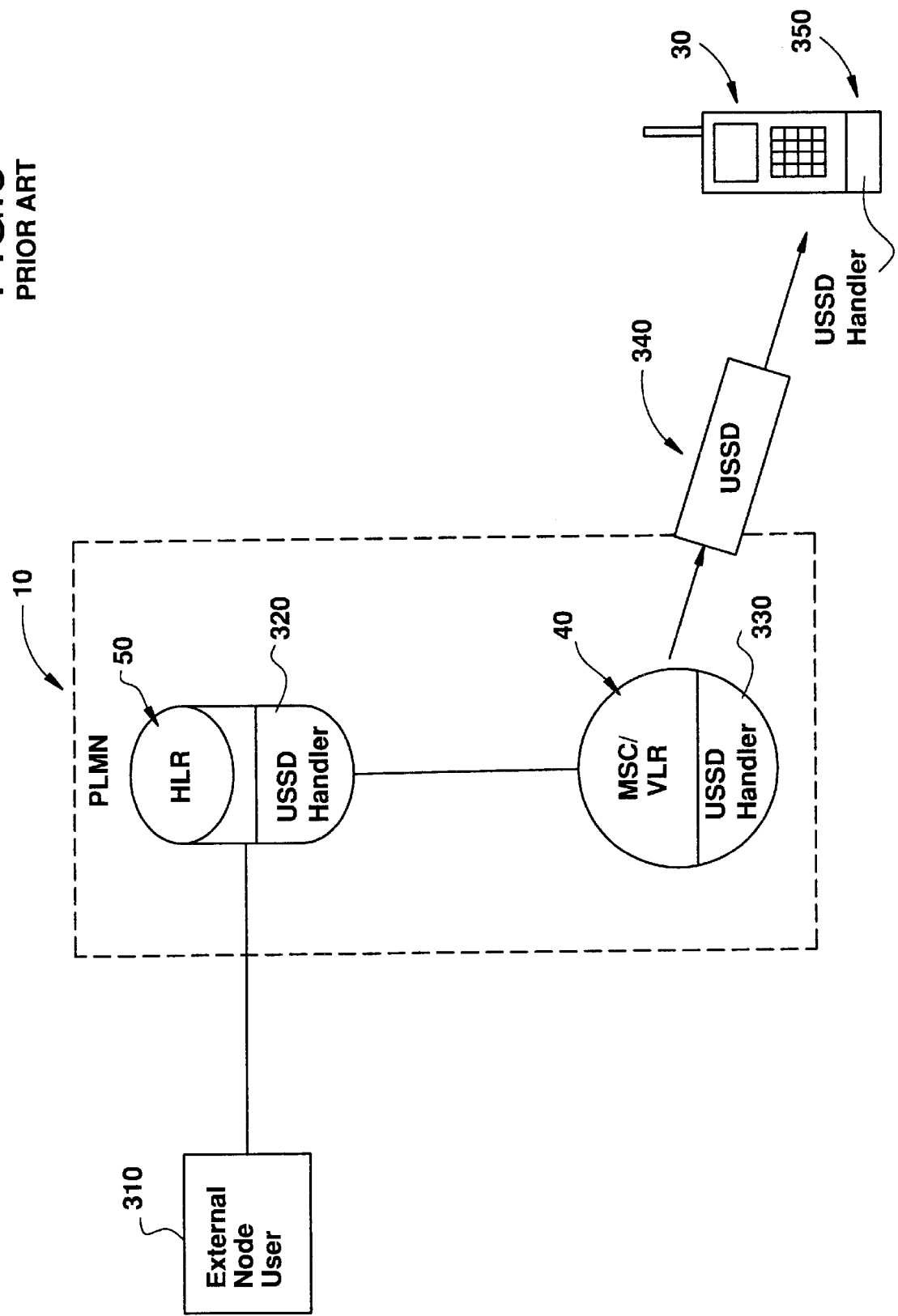
FIG. 3 is a block diagram of a Unstructured Supplementary Service Data (USSD) communications network illustrating the communication of a USSD message to a mobile station.

FIG. 3 is a block diagram illustrating the communication of a USSD message between a USSD external node user 310 and the mobile station 30. USSD messages are utilized by the mobile telecommunications network to transport user defined data to a mobile station or to an application module within a mobile station. Therefore, instead of storing the received character data into a SIM card, the received data are either manipulated by a feature application module within the receiving mobile station 30 to provide special subscriber feature functions or displayed on a display unit for user interaction. As a result, two parties within a mobile telecommunications network can utilize USSD messages to communicate text messages back and forth without establishing a speech connection.

The external node user 310 transmits a USSD message encapsulating the character data to the HLR 50 within the serving PLMN 10. The HLR 50 then ascertains the current location of the mobile station 30, and a USSD handler 320 within the HLR 50 thereafter transparently forwards the USSD message to the appropriate MSC 40 currently serving the mobile station 30. A USSD handler 330 within the serving MSC/VLR 40 then receives the transmitted message and transports the USSD message 340 to the mobile station 30 over a connection-less communications link. A USSD handler 350 within the mobile station 30 then receives the transmitted USSD message 340, extracts the encapsulated character data, and forwards the extracted data to the appropriate application module. One example of such an application module is a user interface module for displaying the received character data onto a display unit attached to the mobile station 20.

A mobile subscriber, however, is not capable of receiving any of the above services and messages unless the mobile station is turned on and is responding to the paging performed by the serving MSC. For example, if the mobile station is outside of the effective radio coverage area, an incoming call towards the unreachable mobile station is unsuccessfully terminated. In order for that mobile station to subsequently determine the identity of the previously attempted incoming call, the mobile station has to either be associated with voice mail or be called back by the same calling party. Such alternatives are disadvantageous for a number of reasons. Not all calling party subscribers leave voice messages along with their directory numbers with the called party's voice mail system. The called party mobile station must also repeatedly access its voice mail system and inconveniently check its messages each time after being turned on or traveling back into the service area.

Figure 4:
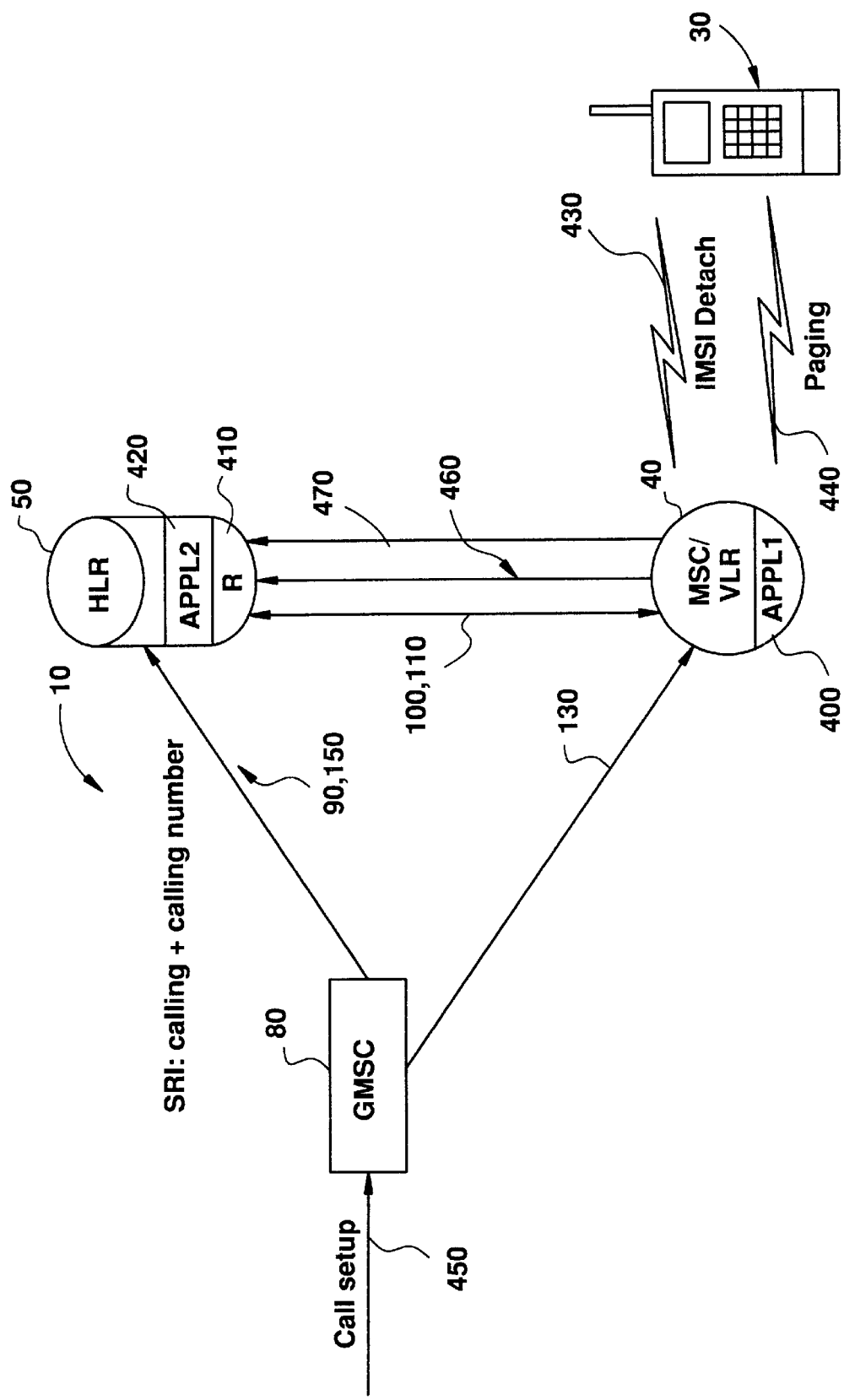
FIG. 4 is a block diagram of a PLMN illustrating the updating of a home location register (HLR) to indicate that a particular mobile station is no longer reachable in accordance with the teachings of the present invention.

In accordance with the teachings of the present invention, FIG. 4 is a block diagram of a PLMN 10 illustrating the updating of a HLR 50 associated with a particular mobile station 30 to indicate that the mobile station 30 is no longer reachable. Right before the mobile station 30 is turned off, the mobile station 30 transmits a Direct Transfer Application Part (DTAP) based International Mobile Subscriber Identity Detach (IMSI Detach) signal to inform the serving MSC/VLR 40 that the mobile station is about to be turned off. The serving MSC/VLR then marks its register to indicate that the mobile station is detached. No paging on that particular mobile station is subsequently performed until a new registration is performed. An application module 400 within the serving MSC/VLR 40 then transmits a Mobile Application Part (MAP) based IMSI detach signal 460 to the HLR 50 associated with the detaching mobile station 30. As a result, the HLR 50 stores an indication at a register 410 indicating that the mobile station 40 is no longer reachable.

In another embodiment of the present invention, the mobile station 30 is periodically required to register with the serving MSC/VLR 40 to inform the serving MSC/VLR 40 that the mobile station 30 is still reachable. As a result, if an expected registration is not received from the mobile station, the serving MSC/VLR 40 assumes that the mobile station 30 has become unreachable and transmits a MAP based IMSI Detach signal to the associated HLR 50. The HLR 50, in turn, stores an indication at the register 410 representing that the mobile station 30 is again unreachable.

Thereafter, an incoming call setup signal, such as an Initial Address Message (IAM), is received by the serving GMSC 80 associated with the home PLMN 10. As described in FIG. 1, the GMSC 80 then interrogates the associated HLR 50 for routing instructions by transmitting a MAP based Send Routing Information (SRI 90). The SRI signal 90 further includes the calling party directory number as well as the called party directory number. In response to such a signal, an application module 420 within the HLR 50 retrieves the indication stored at the register 410 and determines that the destination called party mobile station is unreachable. After making such a determination, the application module 420 stores the calling party directory number included in the received SRI signal at the register 410 and informs the GMSC 80 of a unsuccessful termination.

On the other hand, if the HLR 50 has not yet been updated with an IMSI Detach, the HLR 50, in turn, communicates a Provide Roaming Number signal (PRN 100) to the MSC/VLR 40 supposedly still serving the called party mobile station 30. If a determination is then made by the serving MSC/VLR 40 that the mobile station is not reachable, an application module 400 within the serving MSC/VLR 400 sends a Provide Roaming Number Acknowledgment (PRI_Ack) signal 110 with a SubscriberAbsent return code back to the HLR 50. The SubscriberAbsent return code indicates to the HLR 50 that the specified mobile station is no longer "attached" or "registered" with the serving MSC/VLR 40. The application module 420 then stores the calling party directory number included in the SRI signal 90 at the register 410 and again informs the GMSC 80 of the unsuccessful termination.

Otherwise, absent any indication to reflect that the mobile station is unreachable, the serving MSC/VLR 40 returns the roaming number to the HLR 50. The HLR 50, in turn, forwards the received roaming number to the GMSC 80. Utilizing the received roaming number, the GMSC 80 reroutes the received incoming call to the serving MSC/VLR 400 (signal 130) in a conventional manner. The serving MSC/VLR 50 then attempts to page the called party mobile station 30 over a page channel (PCH) 440. If an acknowledgment is received in response to the paging request, appropriate radio channels are seized and a call connection is accordingly established in a conventional manner. However, if the called party mobile station 30 fails to respond to the paging, the application module 400 within the serving MSC/VLR 40 transmits another MAP based signal 470 informing the HLR 50 of the mobile stations non-responsiveness. The transmitted MAP signal 470 further includes the calling party directory number received from the incoming call setup signal 130. In a manner similar to as described above, the application module 420 then assumes that the mobile station is unreachable and stores the calling party directory number included in the received MAP signal 470.

As a result, a calling party directory number associated with an incoming call received while the mobile station was either turned off or out-of-service area (unreachable) is stored at the register 410 associated with the HLR 50.

Figure 5:
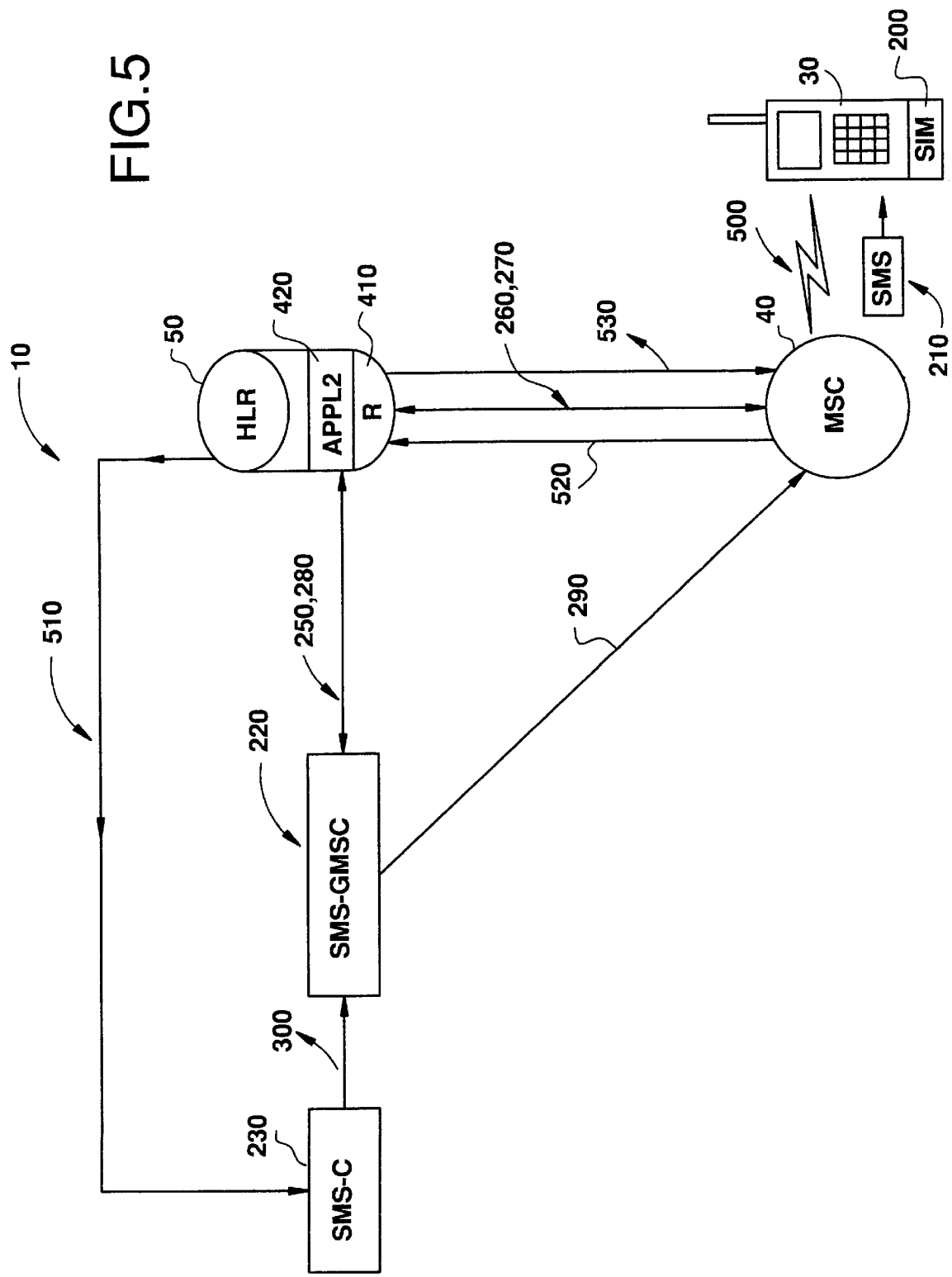
FIG. 5 is a block diagram of a SMS communications network illustrating the communication of a SMS message from an HLR to a reachable mobile station in accordance with the teachings of the present invention.
Figure 6:
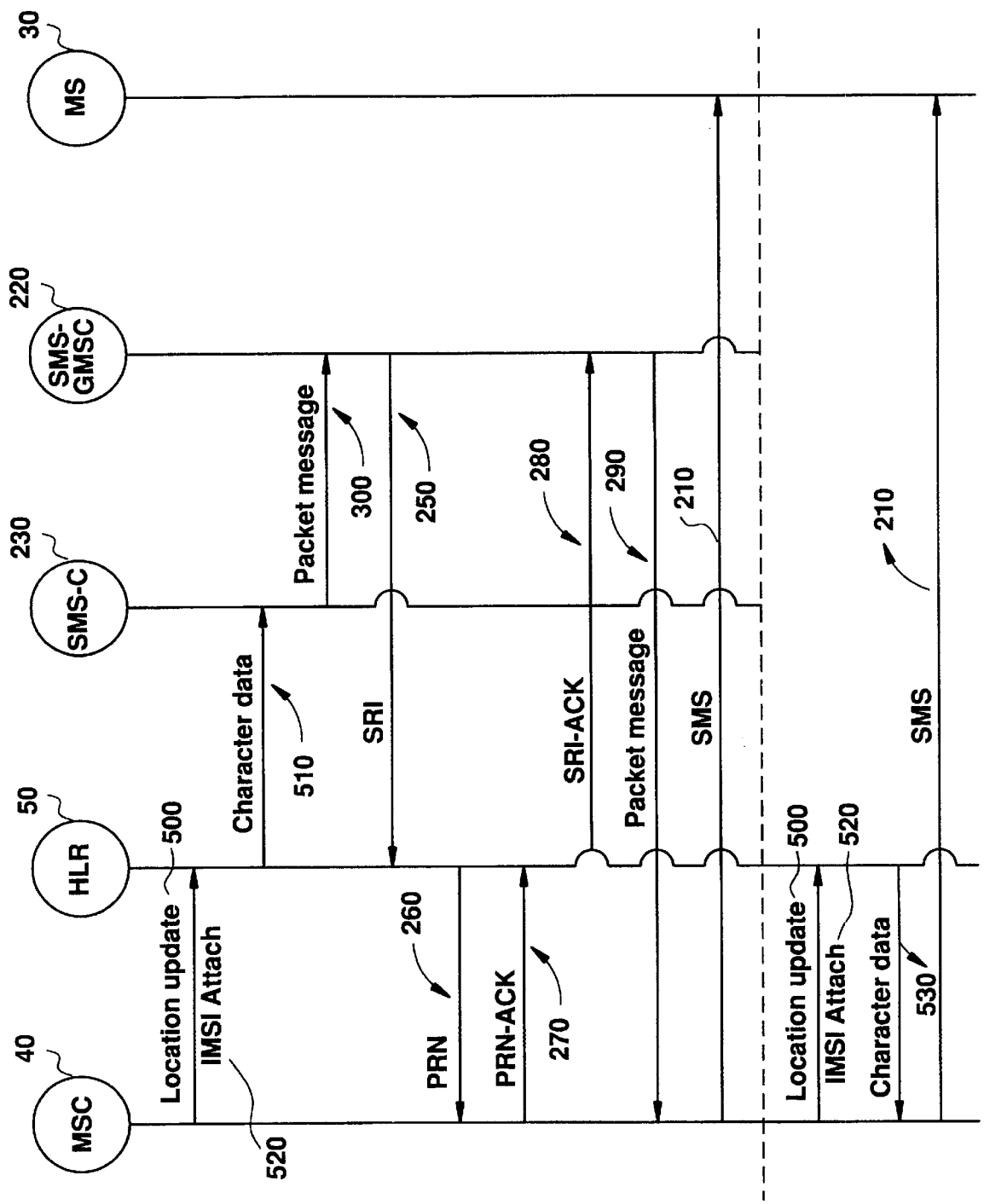
FIG. 6 is a signal sequence diagram illustrating the communication of a SMS message from an HLR to a reachable mobile station.

Reference is now made to both FIGS. 5 and 6 illustrating the communication of a SMS message 210 from the associated HLR 50 to the reachable mobile station 30. Whenever the mobile station turns on its unit or travels into a new coverage area, it originates a signal 500 to inform a particular MSC/VLR 40 serving the current geographic location that the mobile station 30 is available for mobile service. As an illustration, the serving MSC/VLR 40 transmits a MAP based signal 500 to the associated HLR 50. Such a signal includes an IMSI attach signal and location update signal. In response to such an indication that the mobile station 30 is now reachable, the application module 420 within the HLR 50 retrieves the previously stored calling party number associated with the attempted incoming call received while the mobile station was unreachable as illustrated in FIG. 4. Utilizing a SMS message, the application module 420 then communicates the retrieved calling party number to the reachable mobile station 30. Accordingly, in order to reduce the impact to the conventional SMS routing mechanism within the connected telecommunications network, the application module 420 transmits a packet data 510 encapsulating the retrieved calling party directory number to the SMS-C 230 associated with the serving PLMN 10. Further utilizing the included MSISDN number associated with the mobile station 30, the SMS-C 230 transmits a signal 300 to the SMS-GMSC 220 serving the home PLMN 10 in a conventional manner as described in FIG. 2. The SMS-GMSC 220 then interrogates the HLR 50 (signals 250, 280) which, in turn, requests a roaming number from the serving MSC 40 (signals 260, 270). Utilizing the received roaming number, the SMS-GMSC 220 reroutes the received signal to the serving MSC 40 (signal 290). The serving MSC 40 then pages the mobile station 30 and transmits a SMS message 210 to the SIM card 200 attached to the destination mobile station 30. The calling party directory number encapsulated in the received SMS message can then be displayed to the mobile subscriber.

As another embodiment of the present invention, the application module 420 within the HLR 50 directly transmits a signal 530 encapsulating the retrieved calling party directory number to the serving MSC 40. Such a signal may be a MAP based signal or any other Signaling Connection Control Part (SCCP) based signal transportable over a Signaling System No. 7 (SS7) telecommunications network. The serving MSC 40 then transmits the SMS message 210 directly towards the mobile station 30 over a SDCCH or SACCH channel.

Figure 7:
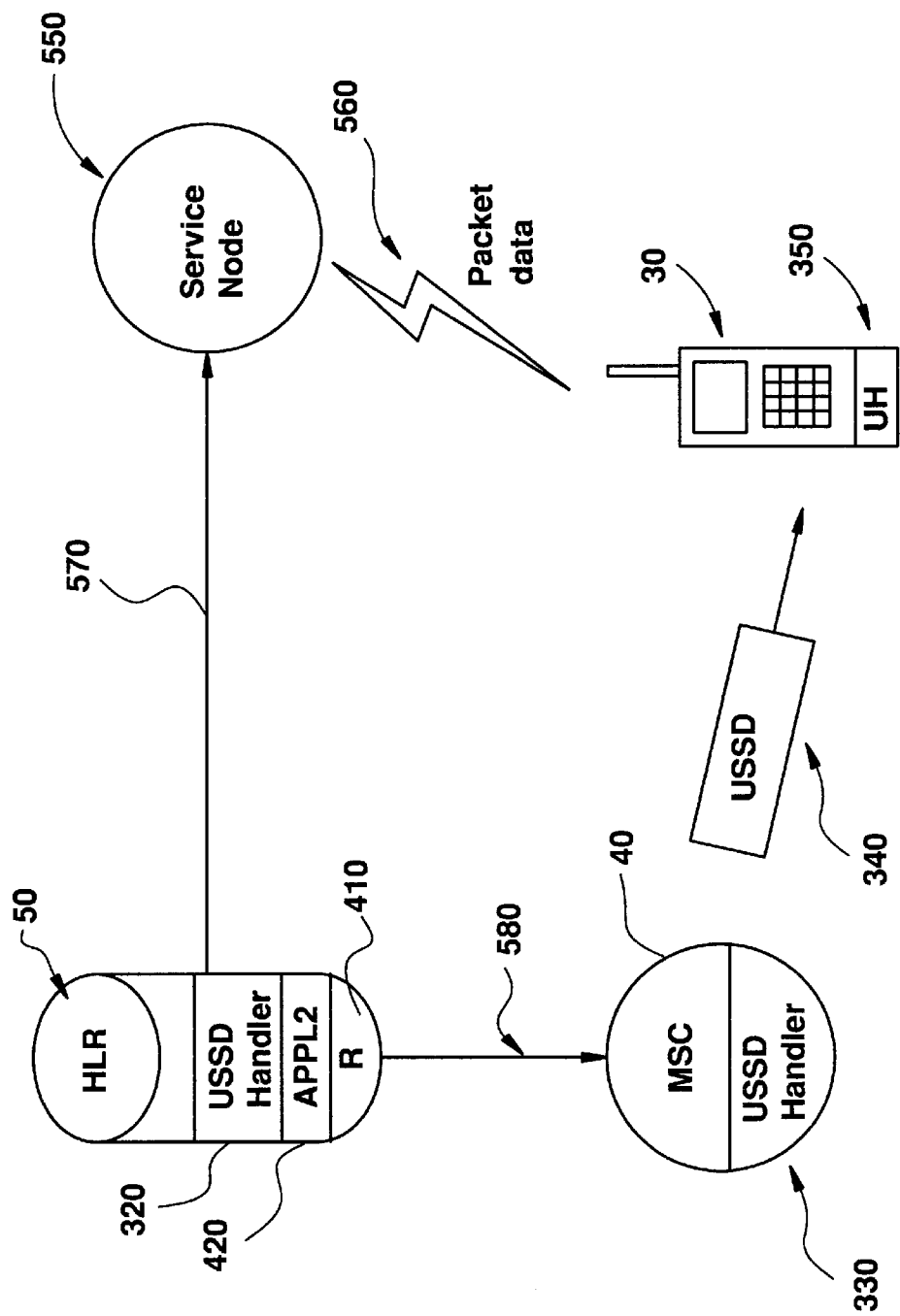
FIG. 7 is a block diagram of communications networks illustrating the communication of a USSD or packet message from an HLR to a reachable mobile station.

Reference is now made to FIG. 7 illustrating the communication of a Unstructured Supplementary Service Data (USSD) message from the HLR 50 to the mobile station 30. As fully described in FIGS. 5 and 6, a calling party directory number associated with an incoming call received towards the unreachable mobile station is stored at the register 410 associated with the HLR 50. Thereafter, whenever the HLR 50 receives an indication from a particular MSC 40 that the mobile station 30 is reachable again, the application module 420 within the HLR 50 retrieves the stored calling party directory number associated with the previously received unsuccessful incoming call. By interfacing with the USSD handler 320, the application module 420 then transmits a USSD signal 580 including the calling party directory number directly towards the serving MSC 40. The USSD handler 330 within the serving MSC 40, in turn, transmits a USSD message 340 including the received calling party directory number to the mobile station 30 currently traveling within its coverage area. Lastly, the USSD handler 350 associated with the mobile station 30 receives the transmitted message, extracts the included calling party directory number, and display it onto a display unit enabling the mobile subscriber to be informed of the calling party directory number associated with the incoming call that was attempted while the mobile station was unreachable.

In yet another embodiment of the present invention, the application module 420 instead transmits a signal 570 including the retrieved calling party directory number to an external service node 550. The service node 550, in turn, transmits a packet signal 560 including the received calling party directory number to the destination mobile station 30. Such a packet signal 560 includes a General Packet Radio Switch (GPRS) signal.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for communicating a caller identification number to a called party mobile station within a mobile telecommunications network, said method comprising the steps of:

receiving a request associated with an incoming call towards a called party mobile station at a first telecommunications node, said request including a caller identification number assigned to a calling party subscriber associated with said received incoming call;

determining that said called party mobile station is not reachable;

storing said received caller identification number in response to said determination;

determining that said called party mobile station is now reachable by receiving a first indication including a location update signal from a mobile switching center (MSC) with which said called party mobile station has newly registered for service; and transmitting, in response to a receipt of said first indication, said stored caller identification number to said called party mobile station.

2. The method of claim 1 wherein said first telecommunications node comprises a home location register (HLR) associated with said called party mobile station.

3. The method of claim 1 wherein said request comprises a Mobile Application Part (MAP) based Send Routing Information (SRI) signal.

4. The method of claim 1 wherein said step of determining that said called party mobile station is not reachable further comprises the step of determining that a second indication has been received from a mobile switching center/visitor location register (MSC/VLR) serving said called party mobile station informing said first telecommunications node that said called party mobile station is not reachable.

5. The method of claim 4 wherein said second indication comprises a International Mobile Subscriber Identity (IMSI) detach signal.

6. The method of claim 4 wherein said second indication comprises a Provide Roaming Number Acknowledgment (PRN_Ack) signal.

7. The method of claim 6 wherein said PRN_Ack signal further comprises a AbsentSubscriber return code for indicating that said called party mobile station is not reachable.

8. The method of claim 4 wherein said second indication comprises a Mobile Application Part (MAP) based signal informing said first telecommunications node that said called party mobile station has failed to respond to paging.

9. The method of claim 1 wherein said first indication further includes an International Mobile Subscriber Identity Attach (IMSI Attach) signal.

10. The method of claim 1 wherein said step of transmitting said stored caller identification number to said reachable called party mobile station further comprises the step of transmitting data using a unstructured message.

11. The method of claim 10 wherein said unstructured message comprises a Short Message Service (SMS) message.

12. The method of claim 11 wherein said SMS message is transmitted to said called party mobile station using a Short Message Service Center (SMS-C).

13. The method of claim 11 wherein said SMS message is transmitted from said first telecommunications node directly to a mobile switching center (MSC) currently serving said called party mobile station.

14. The method of claim 10 wherein said unstructured message comprises an Unstructured Supplementary Service Data (USSD) message.

15. The method of claim 10 wherein said unstructured message comprises a General Packet Radio Switch (GPRS) signal.

16. A method for communicating a directory number associated with a calling party subscriber for a particular incoming call towards a mobile station, said method comprising the steps of:

receiving said directory number associated with the calling party subscriber at a mobile telecommunications node;

storing said directory number at said mobile telecommunications node;

determining that said called party mobile station is reachable by receiving a signal from a mobile switching center/visitor location register (MSC/VLR) serving said called party mobile station, said received signal further includes a selected one of a Mobile Application Part (MAP) based location update signal and a Mobile Application Part (MAP) based International Mobile Subscriber Identity Attach (IMSI Attach) signal; and communicating said stored directory number from said mobile telecommunications node towards said called party mobile station.

17. The method of claim 16 wherein said telecommunications node comprises a home location register (HLR) associated with said called party mobile station and wherein said step of receiving said directory number further comprises the step of receiving a Mobile Application Part (MAP) based signal from a Gateway Mobile Switching Center (GMSC) associated with said HLR.

18. The method of claim 16 wherein said step of communicating said stored directory number comprises the step of transmitting a Unstructured Supplementary Service Data (USSD) signal including said stored directory number towards said mobile switching center/visitor location register (MSC/VLR) serving said called party mobile station.

19. The method of claim 16 wherein said step of communicating said stored directory number comprises the step of transmitting a Short Message Service (SMS) signal including said stored directory number towards said mobile switching center/visitor location register (MSC/VLR) serving said called party mobile station.

20. The method of claim 16 wherein said step of communicating said stored directory number comprises the step of transmitting packet data towards said mobile switching center/visitor location register (MSC/VLR) serving said called party mobile station.

21. A mobile telecommunications node within a mobile telecommunications network for communicating a directory number associated with a calling party subscriber to a called party mobile station, comprising:

a receiver for receiving said directory number associated with said calling party subscriber for a particular incoming call directed towards said called party mobile station;

a register for storing said directory number;

a processor for determining that said called party mobile station is reachable by receiving an indication including a location update signal from a mobile switching center (MSC) of the mobile telecommunications network with which said called party mobile station has newly registered for service; and a transmitter for communicating said stored directory number from said mobile telecommunications node to said called party mobile station.

22. The mobile telecommunications node of claim 21 which comprises a home location register (HLR) associated with said called party mobile station.

23. The mobile telecommunications node of claim 22 which is further associated with a gateway mobile switching center (GMSC) and wherein said directory number is included in a Mobile Application Part (MAP) transmitted from said GMSC to said HLR.

24. The mobile telecommunications node of claim 21 wherein said indication further includes an International Mobile Subscriber Identity Attach (IMSI Attach) signal.

25. The mobile telecommunications node of claim 21 wherein said transmitter transmits a Short Message Service (SMS) message including said directory number to said called party mobile station.

26. The mobile telecommunications node of claim 21 wherein said transmitter transmits a Unstructured Supplementary Service Data (USSD) message including said directory number to said called party mobile station.

27. The mobile telecommunications node of claim 21 wherein said transmitter transmits a General Packet Radio Switch (GPRS) signal.

* * * * *

UNITED STATES PATENT AND TRADEMARK OFFICE
CERTIFICATE OF CORRECTION

PATENT NO. : 5,930,701
DATED : Jul. 27, 1999
INVENTOR(S) : Skog

It is certified that error appears in the above-identified patent and that said Letters Patent is hereby corrected as shown below:

Column 7, line 56  Replace "500" With --520--

Signed and Sealed this

Twenty-first Day of December, 1999

Attest:

Q. TODD DICKINSON

*Attesting Officer*   *Acting Commissioner of Patents and Trademarks*